United States Patent
Zhou et al.

[11] Patent Number: 6,040,066
[45] Date of Patent: Mar. 21, 2000

[54] REWRITABLE OPTICAL INFORMATION MEDIUM

[75] Inventors: Guo-Fu Zhou; Bernardus A.J. Jacobs; Johannes C.N. Rijpers; Hermanus J. Borg, all of Eindhoven, Netherlands

[73] Assignee: U.S. Philips Corporation, New York, N.Y.

[21] Appl. No.: 09/206,430

[22] Filed: Dec. 7, 1998

[30] Foreign Application Priority Data

Dec. 11, 1997 [EP] European Pat. Off. .............. 97203894

[51] Int. Cl.⁷ .................................................. B32B 3/00
[52] U.S. Cl. .................. 428/641; 428/64.4; 428/64.5; 428/64.6; 428/457; 428/913; 430/270.13; 430/495.1; 430/945; 369/283; 369/288
[58] Field of Search ................... 428/64.1, 64.2, 428/64.4, 64.5, 64.6, 457, 913; 430/270.13, 495.1, 945; 369/283, 288

[56] References Cited

U.S. PATENT DOCUMENTS

| | | | |
|---|---|---|---|
| 5,100,700 | 3/1992 | Ide et al. | 428/64 |
| 5,289,453 | 2/1994 | Ohno et al. | 369/100 |
| 5,684,778 | 11/1997 | Yamada et al. | 369/100 |
| 5,876,822 | 3/1999 | Zhou et al. | 428/64.1 |

*Primary Examiner*—Elizabeth Evans
*Attorney, Agent, or Firm*—Norman H. Spain

[57] ABSTRACT

A rewritable optical information medium has a phase-change recording layer (3) on the basis of an alloy of Ge-Sb-Te-O, having the composition $(Ge_aSb_bTe_c)_{1-d}O_d$, wherein:

$$a+b+c=1$$

$$0.0001 \le d \le 0.035$$

The addition of oxygen considerably speeds up the crystallization rate of Ge-Sb-Te materials. Such a medium is suitable for high speed recording (i.e. at least eight times the CD-speed), such as for DVD-RAM and optical tape. The amount of oxygen in the recording layer (3) can be used to tune the crystallization rate to the desired value.

8 Claims, 5 Drawing Sheets

REWRITABLE OPTICAL INFORMATION MEDIUM

BACKGROUND OF THE INVENTION

The invention relates to an optical information medium for erasable high-speed recording by means of a laser-light beam, said medium comprising a substrate carrying a stack of layers, which stack comprises, in this order, a first dielectric layer, a recording layer of a phase-change material comprising a compound consisting of Ge, Sb, Te and O, a second dielectric layer and a metal mirror layer.

The invention also relates to the use of such an optical recording medium in high storage density and high data rate applications.

Optical information or data storage based on the phase change principle is attractive, because it combines the possibilities of direct overwrite (DOW) and high storage density with easy compatibility with read-only systems. Phase-change optical recording involves the formation of submicrometer-sized amorphous recording marks in a thin crystalline film using a focused laser-light beam. During recording information, the medium is moved with respect to the focused laser-light beam which is modulated in accordance with the information to be recorded. Due to this, quenching takes place in the phase-change recording layer and causes the formation of amorphous information bits in the exposed areas of the recording layer which remains crystalline in the unexposed areas. Erasure of written amorphous marks is realized by recrystallizing through heating with the same laser. The amorphous marks represent the data bits, which can be reproduced via the substrate by a low-power focused laser-light beam. Reflection differences of the amorphous marks with respect to the crystalline recording layer bring about a modulated laser-light beam which is subsequently converted by a detector into a modulated photocurrent in accordance with the coded, recorded digital information.

One of the main problems in high speed phase-change optical recording is the required erasing (recrystallization) speed. High crystallization speed is particularly required in high-density recording and high data rate applications, such as disc-shaped DVD-RAM and optical tape, where the complete crystallization time (complete erase time: CET) has to be shorter than 50 ns. If the crystallization speed is not high enough to match the linear velocity of the medium relative to the laser-light beam, the old data (amorphous marks) from the previous recording cannot be completely removed (recrystallized) during DOW. This will cause a high noise level.

An optical information medium of the type mentioned in the opening paragraph is known from U.S. Pat. No. 5,100, 700. The known medium of the phase-change type comprises a substrate carrying a stack of layers consisting, in succession, of a first dielectric or protective layer, a recording layer of a phase-change Ge-Sb-Te compound comprising between 5 and 20 at. % oxygen, a second dielectric layer and a metal reflective layer. Such a stack of layers can be referred to as an (S)IPIM-structure, wherein S represents a substrate, M represents a reflective or mirror layer, I represents a dielectric layer and P represents a phase-change recording layer. Said patent does not disclose any values about CET or erasing speed.

As will be shown below, such relatively high oxygen concentrations in the recording layer adversely affect not only the CET-value, but also other important parameters, such as jitter and cyclability. Cyclability is expressed as the maximum number of repeated writing (amorphization) and erasing (recrystallization) operations wherein e.g. jitter or change in reflectance of the recording medium remains below a specified value.

SUMMARY OF THE INVENTION

It is an object of the invention to provide, inter alia, a rewritable optical information medium which is suitable for high speed optical recording, such as DVD-RAM and optical tape, having a CET-value of 50 ns or shorter. High speed recording is to be understood to mean in this context a linear velocity of the medium relative to the laser-light beam of at least 7.2 m/s, which is six times the speed according to the Compact Disc standard. Preferably, the CET-value should be below 45 ns, necessary for a linear velocity of 9.6 m/s corresponding to eight times the CD-velocity, or even below 35 ns, necessary for a linear velocity of 14.4 m/s corresponding to twelve times the CD-velocity. The jitter of the medium should be at a low, constant level. Moreover, the medium should have a good cyclability.

These objects are achieved in accordance with the invention by an optical information medium as described in the opening paragraph, which is characterized in that the compound in the recording layer has a composition $(Ge_aSb_bTe_c)_{1-d}O_d$, wherein:

$a+b+c=1$ $0.0001 \leq d \leq 0.035$;

the first dielectric layer having a thickness of 70 to $(70+\lambda/2n)$ nm, wherein $\lambda$ is the wavelength of the laser-light beam, and n is the refractive index of this layer;

the recording layer having a thickness of 10 to 35 nm;

the second dielectric layer having a thickness of 10 to 50 nm;

the metal mirror layer having a thickness of 60 to 160 nm.

It has been found that in compounds based on Ge-Sb-Te, the CET-value can be drastically reduced when oxygen is added to the compound in small amounts of between 0.01 and 3.5 at. %, preferably between 0.1 and 2.0 at. %. Lower oxygen values can hardly be obtained due to the process circumstances in which the recording layer is obtained, e.g. by sputtering in an inert gas atmosphere wherein an oxygen back-ground pressure inevitably will be present. At an oxygen concentration above 3.5 at. %, the CET-value of the recording layer rises above 50 ns, and the jitter and the DOW cyclability are adversely affected. Also, the maximum change of amorphous and crystalline reflection during DOW becomes unacceptable. Moreover, the recorded data (amorphous marks) can become unstable, because of the ease of formation of oxides, when the oxygen content is too high.

For the Ge-Sb-Te compounds to which oxygen is added, a wide variety of compositions can be used. For example those disclosed in U.S. Pat. No. 5,289,453. Said patent discloses compounds $Ge_xSb_yTe_z$ which are located in an area in the triangular ternary Ge-Sb-Te composition diagram, wherein the atomic percentages x, y and z satisfy $45 \leq z \leq 55.5$, $0.5 \leq y/((x+y) \leq 0.72$ and $x+y+z=100$.

Especially useful are the compounds described in the non-prepublished international patent application IB 97/00677 (PHN 15881) filed by Applicants. These compounds have a composition defined in atomic percentages by the formula: $Ge_{50x}Sb_{40-40x}Te_{60-10x}$, wherein $0.166 \leq X \leq 0.444$. These compositions are situated on the line connecting the compounds GeTe and $Sb_2Te_3$ in the triangular Ge-Sb-Te composition diagram, and include the stoichiometric compounds $Ge_2Sb_2Te_5$ (x=0.445), $GeSb_2Te_4$ (x=0.286) and $GeSb_4Te_7$(x=0.166). These compounds show a low CET-value of less than 100 ns.

Preferred compounds are described in the non-prepublished European patent application with application number 97203459.9 (PHN 16586) filed by Applicants. These compounds have a composition, in atomic percentages defined, by an area in the ternary composition diagram Ge-Sb-Te, said area being of pentagonal shape having the following vertices:

$Ge_{14.2}Sb_{25.8}Te_{60.0}$ (P)

$Ge_{12.7}Sb_{27.3}Te_{60.0}$ (Q)

$Ge_{3.4}Sb_{29.2}Te_{57.4}$ (R)

$Ge_{15.1}Sb_{27.8}Te_{57.1}$ (S)

$Ge_{13.2}Sb_{26.4}Te_{60.4}$ (T);

With these compounds CET-values below 50 ns can be achieved.

Especially useful are compounds having a composition:

$(GeSb_2Te_4)_{1-x}Te_x$ wherein the molar fraction x satisfies: $0.01 \leq x \leq 0.37$. These compositions are situated on the tie-line connecting $GeSb_2Te_4$ and Te in the ternary composition diagram, but within the pentagonal area PQRST. With these compounds CET-values below 45 ns can be obtained.

When oxygen is added to the above mentioned Ge-Sb-Te compounds within the values according to the invention, even lower CET-values are obtained.

The first dielectric layer, i.e. the layer between the substrate and the phase-change recording layer, protects the recording layer from humidity and the substrate from thermal damage, and optimizes the optical contrast. From the viewpoint of jitter, the thickness of the first dielectric layer is preferably at least 70 nm. In view of optical contrast, the thickness of this layer is limited to $(70+\lambda/2n)$ nm, wherein $\lambda$ is the wavelength of the laser-light beam, and n is the refractive index of the first dielectric layer.

The CET-value of the above mentioned Ge-Sb-Te-O compounds depends on the layer thickness of the recording layer. CET decreases rapidly as the layer thickness increases up to 10 nm. When the recording layer is thicker than 25 nm, CET is essentially independent of thickness. Above 35 nm the cyclability of the medium is adversely affected. The cyclability of the medium is measured by the relative change of the optical contrast after a large number of DOW-cycles, e.g $10^5$. In every cycle the written amorphous bits are erased by recrystallizing through heating with a laser-light beam while the new amorphous marks are written. In the ideal case, the optical contrast remains unchanged after cycling. The cyclability is practically constant up to a layer thickness of the recording layer of 35 nm. As a result of the combined demands regarding CET and cyclability, the thickness of the recording layer should range between 10 and 35 nm, preferably between 20 and 35 nm, more preferably between 25 and 35 nm. A medium having a recording layer with a thickness between 25 and 35 nm has a constant low jitter during the first $10^5$ DOW-cycles.

An optimum thickness range for the second dielectric layer, i.e. the layer between the recording layer and the metal mirror layer, is found between 10 and 50 mm, preferably between 20 and 40 nm. When this layer is too thin, the thermal insulation between the recording layer and the metal mirror layer is adversely affected. As a result, the cooling rate of the recording layer is increased, which leads to a slow crystallization process and a poor cyclability. The cooling rate will be decreased by increasing the thickness of the second dielectric layer.

The CET-value is not sensitive to the thickness of the metal mirror layer in the range from 20 to 200 nm. But the cyclability is adversely affected when the metal mirror layer is thinner than 60 nm, because the cooling rate is too slow. When the metal mirror layer is 160 nm or thicker, the cyclability deteriorates further, and the recording and erasing power must be high because of the increased thermal conduction. Preferably the thickness of the metal mirror layer is between 80 and 120 nm.

The first and second dielectric layers may be made of a mixture of ZnS and $SiO_2$, e.g. $(ZnS)_{80}(SiO_2)_{20}$. Alternatives are, e.g. $SiO_2$, $TiO_2$, ZnS, AlN, $Si_3N_4$ and $Ta_2O_5$. Preferably, a carbide is used, like SiC, WC, TaC, ZrC or TiC. These materials give a higher crystallization speed and better cyclability than $ZnS-SiO_2$ mixture.

For the metal mirror layer, use can be made of metals such as Al, Ti, Au, Ag, Cu, Rh, Pt, Pd, Ni, Co, Mn, Cr, Mo, W, Hf and Ta, including alloys thereof. Examples of suitable alloys are AlTi, AlCr and AlTa.

Both the reflective layers and the dielectric layers can be provided by vapour deposition or sputtering.

The substrate of the information medium is at least transparent to the laser wavelength, and is made, for example, of polycarbonate, polymethyl methacrylate (PMMA), amorphous polyolefin or glass. In a typical example, the substrate is disc-shaped and has a diameter of 120 mm and a thickness of 0. 1, 0.6 or 1.2 mm.

Alternatively, the substrate may be in the form of a synthetic resin flexible tape, made e.g. from a polyester film. In this way an optical tape will be obtained for use in an optical tape recorder, which is for example based on a fast spinning polygon. In such a device the reflected laser-light beam makes transverse scans across the tape surface.

The surface of the disc-shaped substrate on the side of the recording layer is, preferably, provided with a servotrack which can be scanned optically. This servotrack is often constituted by a spiral-shaped groove and is formed in the substrate by means of a mould during injection moulding or pressing. This groove can be alternatively formed in a replication process in a synthetic resin layer, for example, of UV light-cured layer of acrylate, which is separately provided on the substrate. In high-density recording such a groove has a pitch e.g. of 0.6–0.8 $\mu$m and a width of 0.5 $\mu$m.

Optionally, the outermost layer of the stack is screened from the environment by means of a protective layer of, for example, UV light-cured poly(meth)acrylate.

High-density recording and erasing can be achieved by using a short-wavelength laser, e.g. with a wavelength of 675 nm or shorter (red to blue).

The phase-change recording layer can be applied to the substrate by vacuum deposition, electron beam vacuum deposition, chemical vapour deposition, ion plating or sputtering. When sputtering is used, a sputter target having the desired amount of oxygen can be applied, or use can be made of a Ge-Sb-Te target, thereby controlling the amount of oxygen in the sputtering gas. In practice, the concentration of oxygen in the sputtering gas will be between almost zero and 1% by volume. The layer as deposited is amorphous and exhibits a low reflection. In order to constitute a suitable recording layer having a high reflection, this layer must first be completely crystallized, which is commonly referred to as initialization. For this purpose, the recording layer can be heated in a furnace to a temperature above the crystallization temperature of the Ge-Sb-Te-O compound, e.g. 180° C. A synthetic resin substrate, such as polycarbonate, can alternatively be heated by a laser-light beam of sufficient power. This can be realized, e.g. in a recorder, in which case the laser-light beam scans the moving recording layer. The amorphous layer is then locally heated to the temperature required for crystallizing the layer, without the substrate being subjected to a disadvantageous heat load.

If desired, an additional thin metal and dielectric layer can be inserted between the substrate and the first dielectric layer, thereby forming a so called (S)IMPIM-structure. Although the structure becomes more complicated, the additional metal layer increases the cooling rate of the recording layer as well as the optical contrast.

The crystallization speed can be further increased when the above materials are used in a stack $II^+PI^+IM$ or $II^+PIM$, where $I^+$ is a carbide, nitride or oxide. Experiments show that the CET of an $II^+PI^+IM$ stack is less than 70% that of an IPIM stack.

DETAILED DESCRIPTION OF THE INVENTION

The invention will now be described in greater detail in regard to the figures of thr drawing in the following examples.

Exemplary embodiment 1

Figure 1:
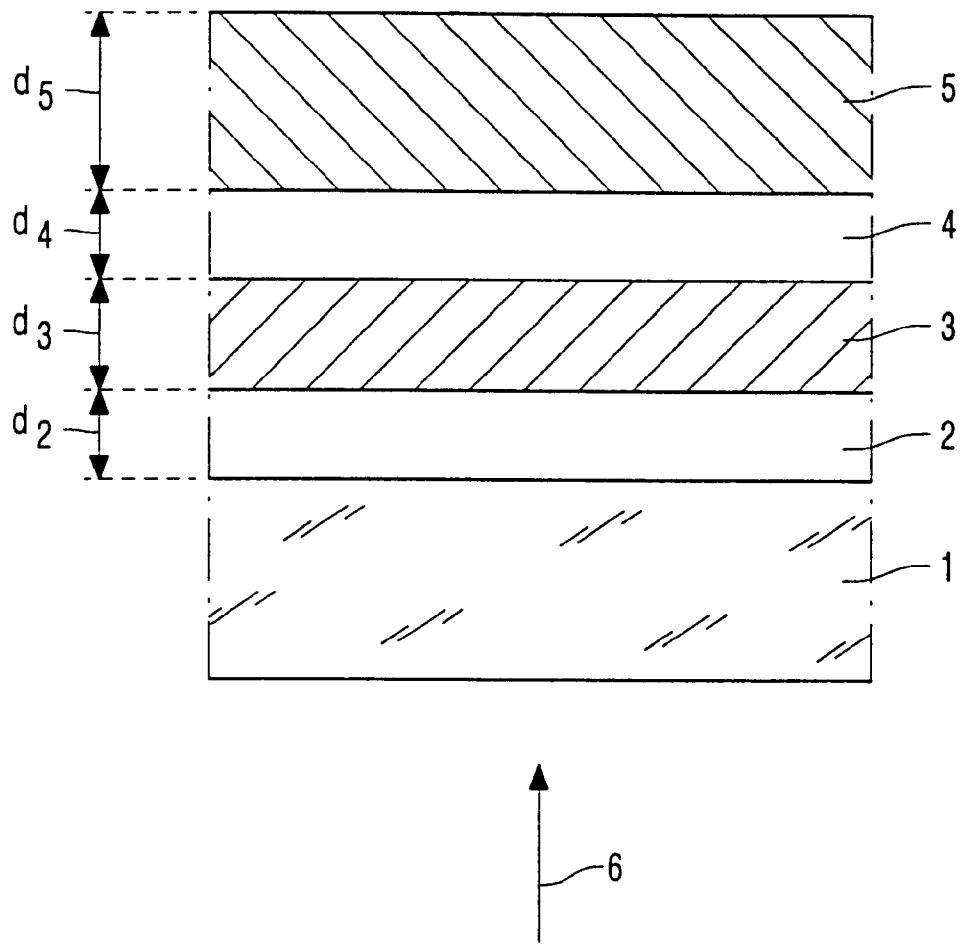
FIG. 1 shows a schematic cross-sectional view of an optical information medium in accordance with the invention.

FIG. 1 schematically shows a part of a cross-section of an optical information disc in accordance with the invention. Reference numeral 1 denotes a polycarbonate disc-shaped substrate having a diameter of 120 mm and a thickness of 1.2 mm. The substrate 1 is provided with an IPIM stack of the following structure:

first dielectric layer 2 of $(ZnS)_{80}(SiO_2)_{20}$ with a thickness $d_2$ =135 nm, recording layer 3 of an alloy of Ge-Sb-Te-O with a thickness $d_3$=27 nm, second dielectric layer 4 of $(ZnS)_{80}(SiO_2)_{20}$ with a thickness $d_4$=26 nm, metal mirror layer 5 of Al with a thickness $d_5$ =80 nm.

All the layers are provided by sputtering. The oxygen content in the recording layer 3 is controlled by adding an amount of oxygen to the argon sputtering gas. Recording layers are deposited with an oxygen amount between 0.01 and 7.0 at. %. The oxygen content in the recording layer 3 is determined by XRF analysis and Auger electron spectroscopy. When no oxygen is added to the sputtering gas, the amount of oxygen in the recording layer 3 is below 0.01 at. %. The composition of the recording layer 3 is then in atomic percentages then is: $Ge_{13.75}Sb_{27.40}Te_{58.85}$. This composition corresponds to Example 2 in the above-mentioned non-prepublished European patent application number 97203459.9 (PHN 16586). When oxygen is added to the recording layer, the (rounded off) composition becomes $(Ge_{0.14}Sb_{0.27}Te_{0.59})_{1-d}O_d$.

The initial crystalline state of the recording layer 3 is obtained by heating the as-deposited amorphous alloy with a focused laser beam in a recorder.

A laser-light beam for recording, reproducing and erasing of information enters the recording layer 3 via the substrate 1. This beam is schematically represented by arrow 6. The amorphous marks are written with a single laser pulse of power $P_W$=1.25 $P_m$ ($P_m$=melting threshold power) and duration 100 ns. The erase power is $P_w/2$.

Figure 2:
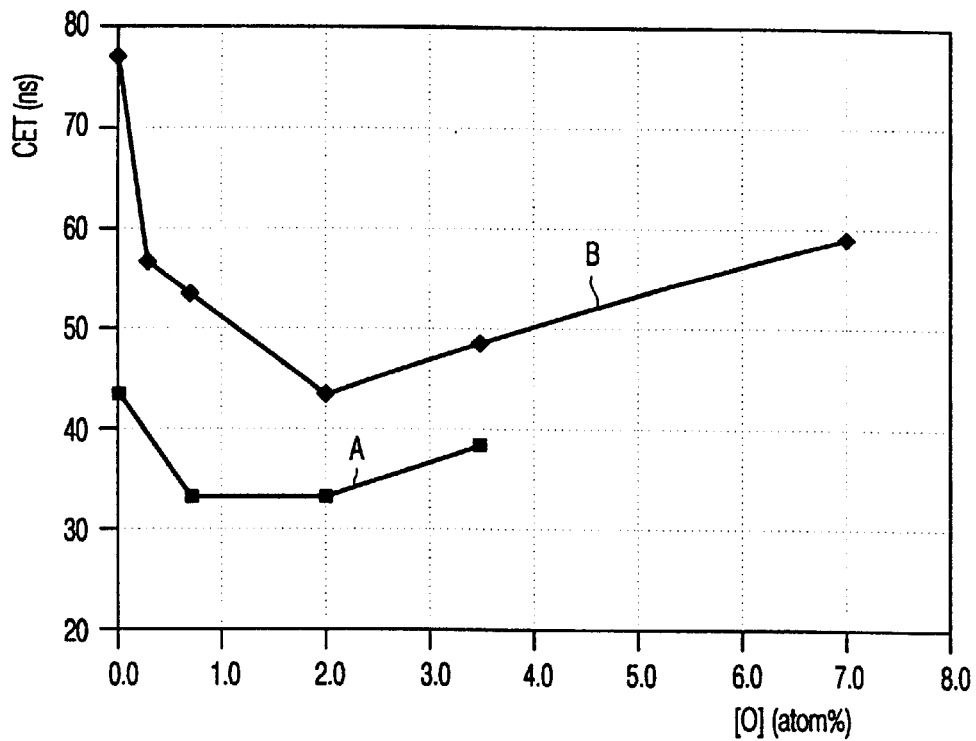
FIG. 2 shows the dependency of the complete erasure time (CET in ns) on the oxygen concentration [O] (in at. %) in the recording layer 3.

Graph A in FIG. 2 shows the dependency of the complete erasure time (CET in ns) on the oxygen concentration [O] (in at. %) in the recording layer 3. The CET-value is defined as the minimum duration of the erasure pulse for complete crystallization of a written amorphous mark in a crystalline environment, which is measured statically. The CET-value of the recording layer without added oxygen is 43 ns. Addition of up to 2 at. % oxygen (d=0.02)to the recording layer reduces CET to 33 ns, which is sufficiently low for a linear velocity of 14.4 m/s, or twelve times the speed according to the CD standard.

Figure 3:
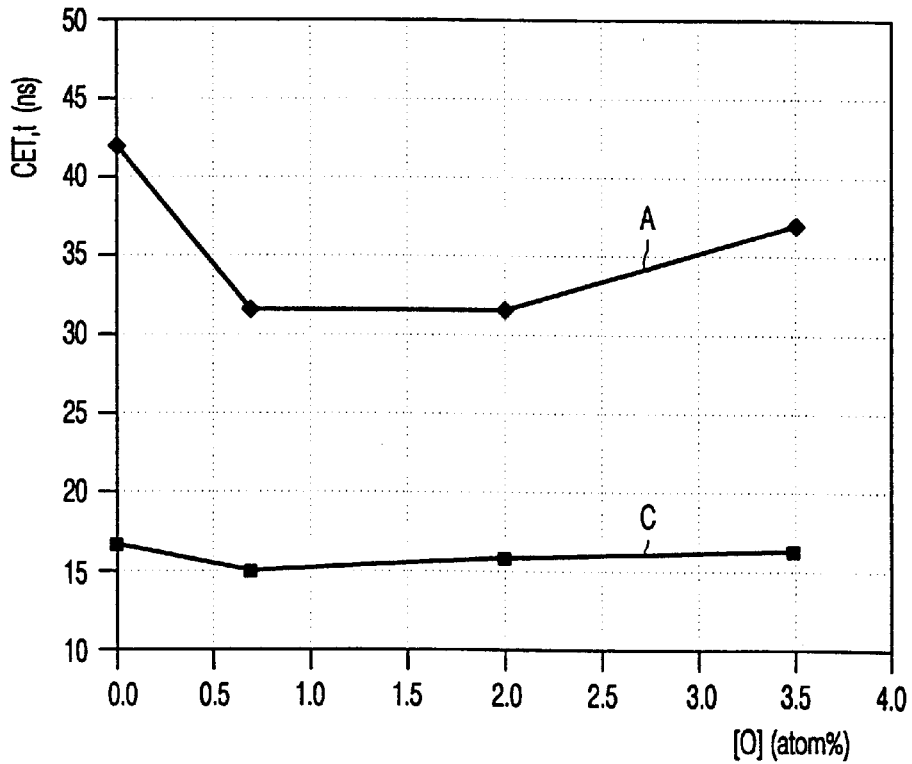
FIG. 3 shows the dependency of the nucleation time t (in ns) and CET (in ns) on the oxygen concentration [O] (in at. %) in the recording layer.

Graph C in FIG. 3 shows the dependency of the nucleation time t (in ns) on the oxygen concentration [O] (in at. %) in the recording layer. The nucleation time is the time that elapses before the first crystallites can be observed, which is shorter than the time necessary for complete crystallization (graph A). In FIG. 3 graph A shows CET (in ns), which is the same as that in FIG. 2. It can be seen that the nucleation time is almost independent of [O].

Figure 4:
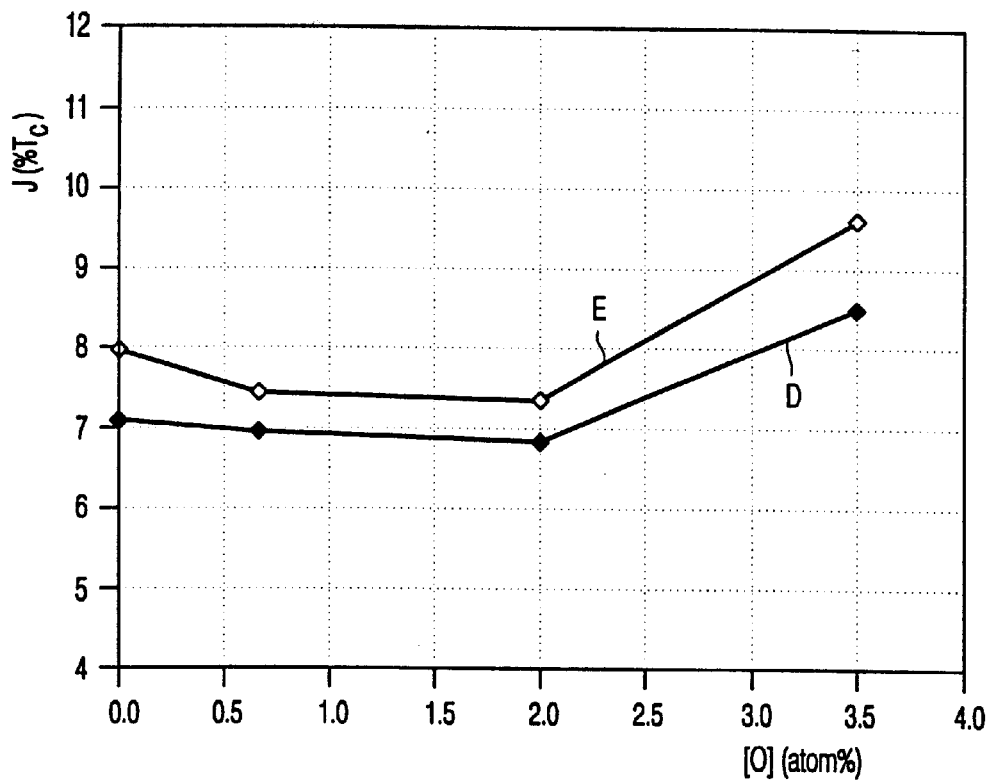
FIG. 4 shows the dependency of the jitter J (in % $T_c$) on the oxygen concentration [O] (in at. %) in the recording layer after 1000 DOW cycles.

FIG. 4 shows the dependency of the jitter J (in % $T_c$) on the oxygen concentration [O] (in at. %) in the recording layer after 1000 DOW cycles for two different recording speeds, namely at 7.2 m/s (six times CD speed) indicated by graph D, and at 9.6 m/s (eight times CD speed) indicated by graph E. During DOW, new amorphous bits are written and simultaneously the areas between the new amorphous bits are crystallized during the same laser spot passage. Jitter, which is the standard deviation of the difference between the edges of a recorded mark and the position corresponding to the recovered data clock time, is a standard parameter used for judging the cyclability of a disc. The jitter has to be below 13% of the clock time $T_c$, i.e. 30 ns at CD speed (1.2 m/s; clock time 230 ns). Both the leading and trailing edges of the marks are measured. For this experiment, the discs are provided on one side of the substrate with a spiral-shaped servotrack in the form of a groove, and are initialized in the recorder. The groove is provided in a UV-light cured layer of acrylate by means of a replication process. From FIG. 4 it can be seen that the DOW jitter is reduced by more than 0.5% abs. $T_c$, which indicates that a shorter channel bit can be recorded. This is very important with a view to achieving a higher tangential recording density.

Figure 5:
FIG. 5 shows the number n of DOW cycles as a function of [O] in at. % in the recording layer.

FIG. 5 shows the number n of DOW cycles as a function of [O] in at. % in the recording layer. The number n is defined as the number of DOW cycles when the jitter reaches 13% $T_c$ at a linear velocity of 7.2 m/s. The graph shows that the number of DOW cycles can be improved by a factor of 3 by the addition of 2 at. % oxygen to the recording layer.

Figure 6:
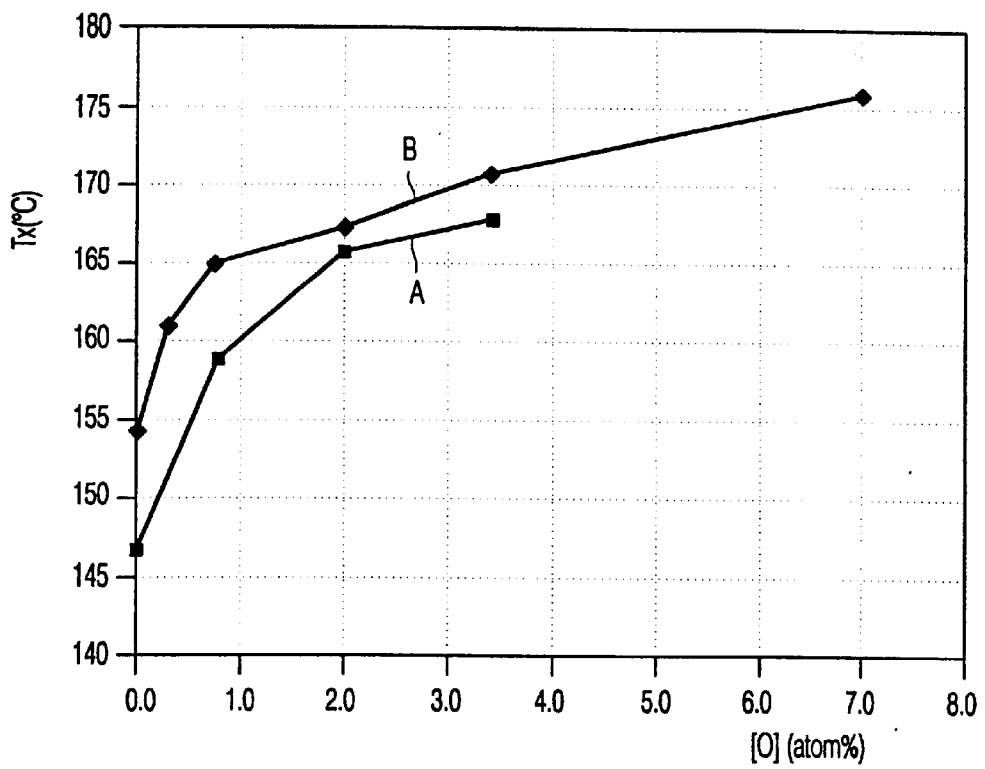
FIG. 6 shows the crystallization temperature $T_x$(□C) as a function of [O] (in at. %)

In FIG. 6 graph A shows the crystallization temperature $T_x$(°C.) as a function of [O] (in at. %). It shows that $T_x$ is significantly increased, which means that a smaller track pitch can be reached without increased cross-erasure.

Figure 7:
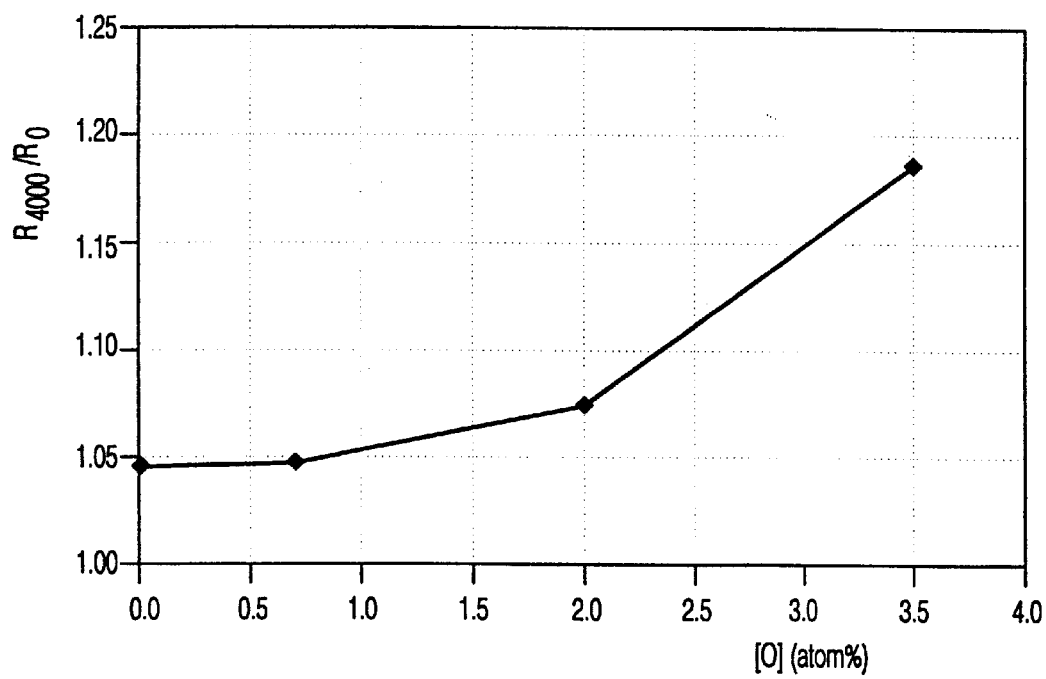
FIG. 7 shows the relative change $R_{4000}/R_0$ of crystalline reflection R, as a function of [O] (at. %) in the recording layer.

FIG. 7 shows the relative change $R_{4000}/R_0$ of crystalline reflection R, in which $R_{4000}$ is the crystalline reflection after 4000 cycles, and $R_0$ is the crystalline reflection at 0 cycles, as a function of [O] (at. %). In every cycle the written amorphous bits are erased by recrystallizing through heating with a laser-light beam while new amorphous marks are written. In the ideal case, the reflection R remains unchanged after cycling. For practical reasons the relative change should preferably be below 15%. From the graph it follows that for this aspect [O] should be below 3 at. %.

Exemplary embodiment 2

Exemplary embodiment 1 is repeated, using a recording layer 3 with the composition $(Ge_{0.15}Sb_{0.29}Te_{0.56})_{1-d}O_d$. Without addition of oxygen, this composition corresponds to Example 17 in the above-mentioned non-prepublished European patent application number 97203459.9 (PHN 16586).

FIG. 2 shows in graph B the dependency of the complete erasure time (CET in ns) on the oxygen concentration [O] (in at. %) in the recording layer 3. The CET-value of the recording layer without added oxygen is 75 ns. Addition of up to 2 at. % oxygen (d=0.02) to the recording layer reduces CET to 43 ns, which is sufficiently low for a linear velocity of 9.6 m/s, or eight times the speed according to the CD standard.

In FIG. 6 graph B shows the crystallization temperature $T_x$(°C.) as a function of [O] (in at. %). It shows that $T_x$ increases significantly when [O] increases, which means that a smaller track pitch can be reached without increased cross-erasure.

Figure 8:
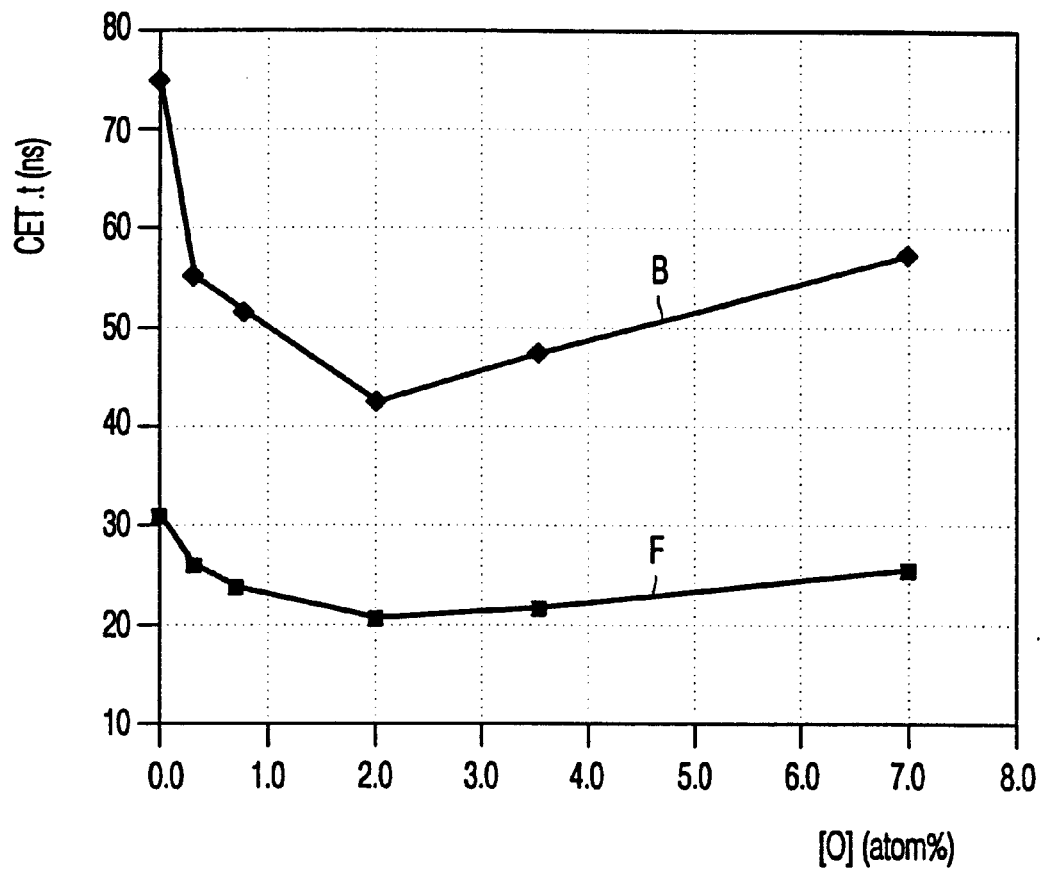
FIG. 8 shows the dependency of the nucleation time t (in ns) and CET (in ns) on the oxygen concentration [O] (in at. %) in the recording layer.

FIG. 8 shows with graph F the dependency of the nucleation time t (in ns) on the oxygen concentration [O] (in at. %) in the recording layer. Graph B shows CET (in ns), which is the same as that in FIG. 2.

According to the invention, a rewritable phasechange optical information medium is provided, such as DVD-RAM or optical tape, with a CET-value of 50 ns or less, which is suitable for direct overwrite and high-speed recording, and exhibits a good cyclability and a low jitter at a linear velocity of 7.2 m/s or more. Addition of oxygen considerably speeds up the crystallization rate of Ge-Sb-Te materials, so that these materials can be used for high data rate recording. Thus, the oxygen content of Ge-Sb-Te can be used to tune the crystallization rate to the desired value.

We claim:

1. An optical information medium for erasable high-speed recording by means of a laser-light beam, said medium comprising a substrate carrying a stack of layers, which stack comprises, in this order, a first dielectric layer, a recording layer of a phase-change material comprising a compound consisting of Ge, Sb, Te and O, a second dielectric layer and a metal mirror layer, characterized in that the compound has a composition $(Ge_aSb_bTe_c)_{1-d}O_d$, wherein:

$$a+b+c=1$$

$$0.0001 \leq d \leq 0.035$$

the first dielectric layer having a thickness of 70 to (70+λ/2n) nm, wherein λ is the wavelength of the laser-light beam, and n is the refractive index of this layer;

the recording layer having a thickness of 10 to 35 nm;

the second dielectric layer having a thickness of 10 to 50 mn;

the metal mirror layer having a thickness of 60 to 160 nm.

2. An optical information medium as claimed in claim 1, characterized in that in the compound:

$$0.001 \leq d \leq 0.020.$$

3. An optical information medium as claimed in claim 1, characterized in that the recording layer has a thickness of 20 to 35 nm, preferably 25 to 35 nmn.

4. An optical information medium as claimed in claim 1, characterized in that the second dielectric layer has a thickness of 20 to 40 nm.

5. An optical information medium as claimed in claim 1, characterized in that the metal mirror layer has a thickness of 80 and 120 nm.

6. An optical information medium as claimed in claim 1, characterized in that the metal mirror layer comprises at least one of the metals selected from a group consisting of Al, Ti, Au, Ag, Cu, Rh, Pt, Pd, Ni, Co, Mn, Cr, Mo, W, Hf and Ta, including alloys thereof.

7. An optical information medium as claimed in claim 1, characterized in that the substrate is a disc or a tape.

8. Use of an optical medium as claimed in claim 1, for high-speed recording, in winch the relative velocity between the laser-light beam and the medium is at least 7.2 m/s.

* * * * *